Figure 1:
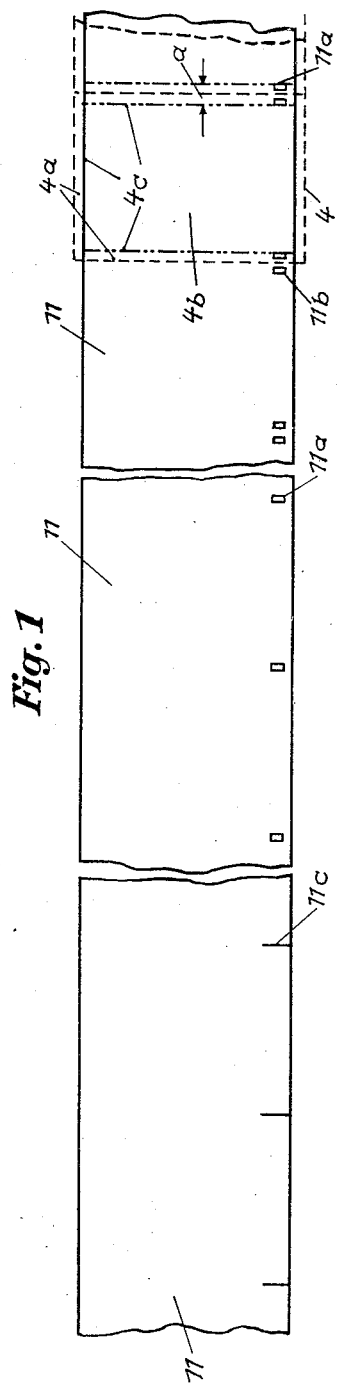

Feb. 15, 1944.     P. KÖNIG ET AL     2,341,625
METHOD OF AND APPARATUS FOR THE CONTINUOUS PRODUCTION OF PHOTOPRINTS
Filed April 17, 1939     3 Sheets-Sheet 1

INVENTORS
P. König
R. König
By Robt & Robb
ATTORNEYS

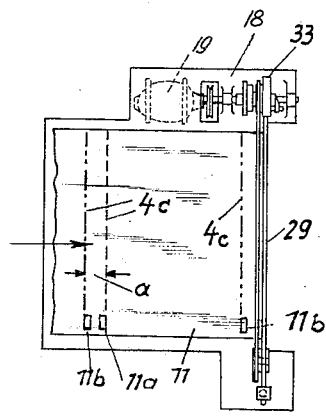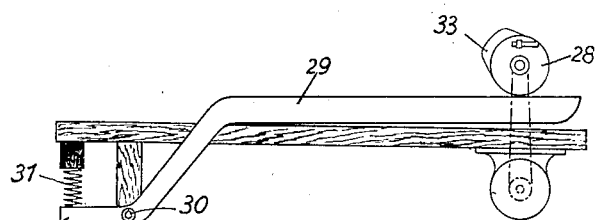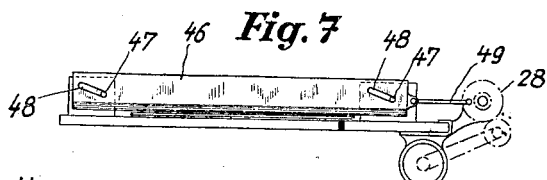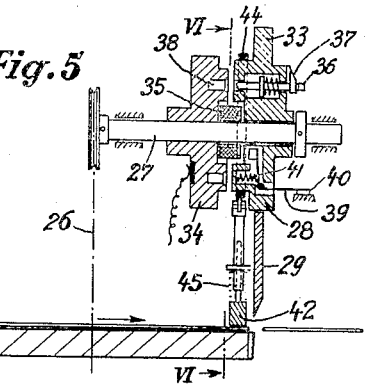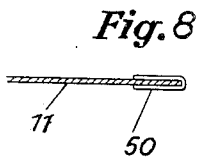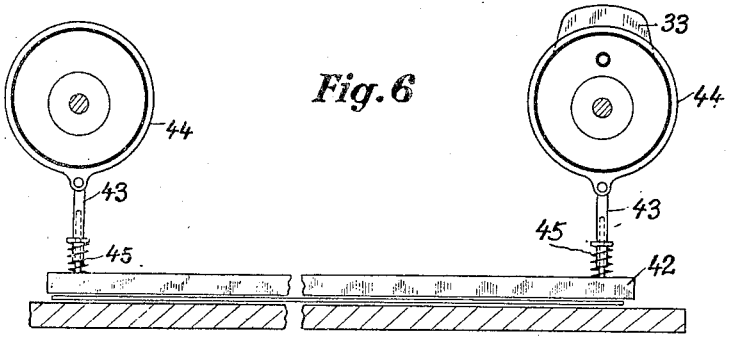

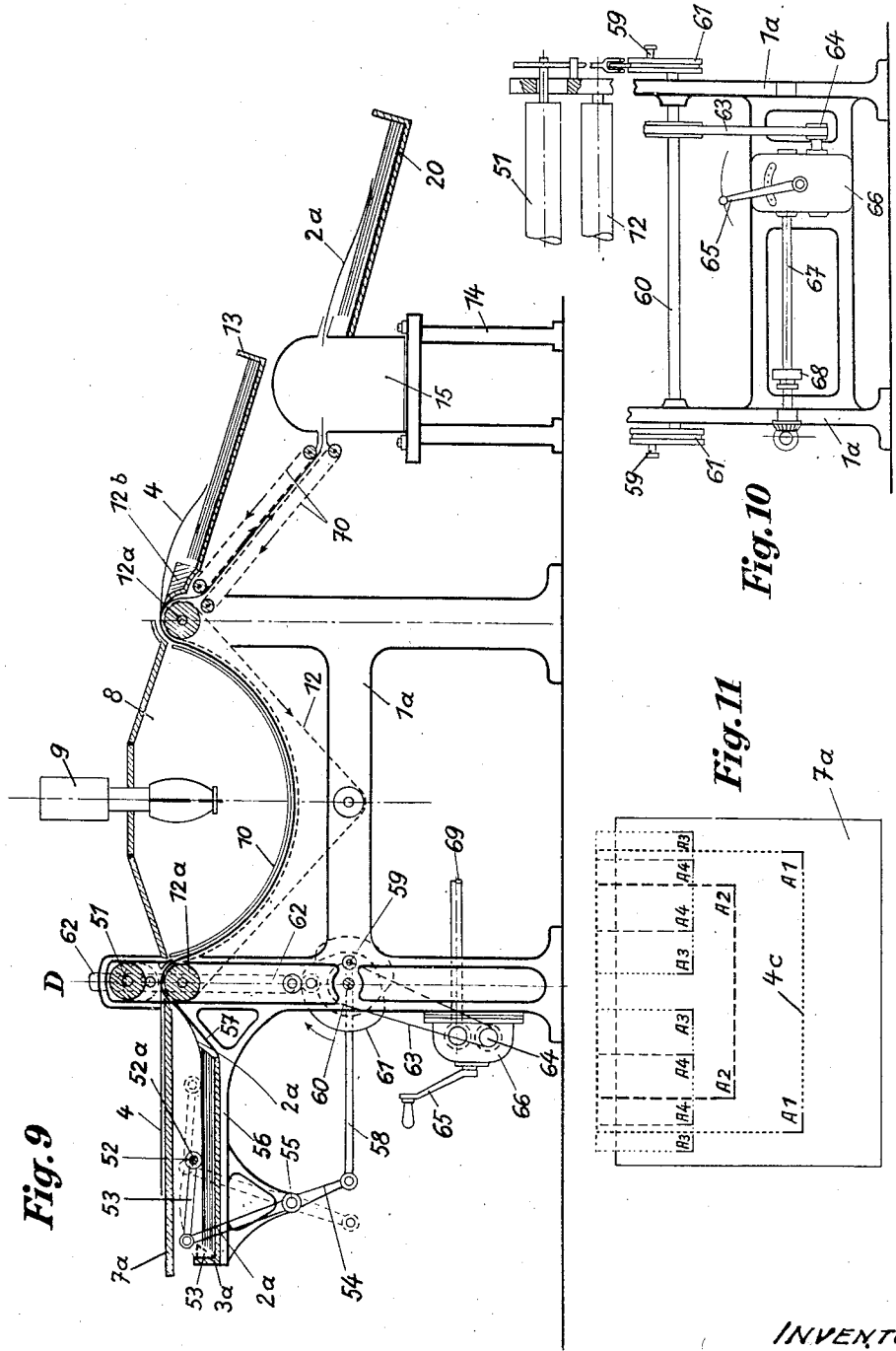

Patented Feb. 15, 1944

2,341,625

UNITED STATES PATENT OFFICE 2,341,625

METHOD OF AND APPARATUS FOR THE CONTINUOUS PRODUCTION OF PHOTOPRINTS

Paul König, Berlin-Friedenau, and Rudolf König, Berlin-Steglitz, Germany; vested in the Alien Property Custodian Application April 17, 1939, Serial No. 268,418
In Germany April 28, 1937

10 Claims. (Cl. 95—73)

This invention relates to a method of and apparatus for the continuous production of photoprints involving the use of printing paper which is automatically passed first together with an original through an exposing device and then by itself through a developing device.

This method of working has hitherto been practised by placing originals on webs of printing paper taken from rolls of standard commercial breadth, in no particular order but so as to utilise as well as may be the total breadth of the web, then passing the web of printing paper with the originals in contact therewith through an exposing device, removing the originals by hand, passing the web of exposed printing paper by itself through a developing device, delevoping and if necessary drying the web, roughly cutting the prints out of the web, and finally trimming the individual finished prints.

The known method is laborious and wasteful. To begin with, the placing of the originals on the printing paper web is attended with difficulties. In order to utilise to good advantage not only the breadth but the entire superficial area of the standard rolled photoprint paper, it is generally necessary to place two or more originals side by side. Since, however, the paper web is continuously in motion, it is generally not possible to place the originals in favourable positions. The result is that free spaces are left on all sides between the originals with additional substantial gaps that remain uncovered, so that considerable wastage of paper occurs.

Since the number of prints comprised in any one printing order must be delivered together with the original it is necessary, with the hitherto known method of working, to sort the prints after the printing work proper has been done, and this sorting operation is tedious and wasteful of time. It is found in practise that the amount of time and trouble required for such incidental work is greater than that involved in the actual printing work. A further disadvantage of the known method is that large quantities of waste printing paper accumulate in the work-rooms.

All these drawbacks are obviated by the present invention, according to which the photoprint paper used is of a breadth equal to one of the main dimensions of the finished prints and is brought into accurate register with the originals prior to being fed into the exposing device, with the aid of guide marks provided for this purpose on the paper and spaced to correspond to the other dimension of the originals, after which on emergence from the exposing device the originals are consecutively detached from the printing paper, collected and stacked in their original order.

When rolls of photoprint paper are used the invention its put into practise by providing the paper web with printed-on, stuck-on, or punched-out guide marks to act as guides in positioning the originals consecutively on the travelling paper web, so that after developing, and without interruption of its movement, the paper web may be fed to a mechanically operated transverse cutter by means of which the individual prints are severed from the web and likewise mechanically collected and stacked in their original order.

The operation of the transverse cutter may be controlled by an adjustable member, associated with the driving gear of the photoprinting machine and adapted to respond periodically, in accordance with the length of the individual prints, so as to effect the operation of the transverse cutter for severing the prints. This control member may for example be a cam connected with a roller or pulley, the periphery of the roller bearing against and driven by the paper web having a circumference corresponding to the length of a single print. The arrangement may also be such that the guide marks themselves serve as members for controlling the transverse cutter and thus fulfil a double function. The machine may be operated either electrically or mechanically.

When sheets of photoprint paper are used, the guide marks are provided on a distributing table which may if desired be transparent, and the procedure in this case is to insert a sheet of printing paper corresponding in size to the total area of the originals to be reproduced in one operation mechanically beneath the originals, the latter being preferably placed with their rear edge touching the gauging or guide marks on the distributing table. The printing paper and originals are then fed jointly into the exposing device.

A particularly important advantage of the new method is that it enables prints to be turned out in large quantities with the smallest consumption of paper that is technically achievable. For this reason the invention requires that the breadth of the printing paper used shall be equal to the breadth or height i. e. to one of the main dimensions, of the finished prints. This eliminates the possibility of any waste in respect of the one dimension of the prints.

Further, the originals are not placed in position on the printing paper by eye, but with the aid of gauging or guide marks ensuring accuracy of positioning, so that the total wastage of printing paper is limited to intermediate strips corresponding to the margins of the originals, while when sheets of printing paper are used there need be no wastage at all.

The new method is also remarkable for the fact that it requires a minimum of work. The provision of guide marks enables the originals to be placed in position not only accurately but also very rapidly, and from the time the originals are placed in position onwards the machine works wholly automatically. To the rear of the exposing device in the direction of feed the originals become automatically detached from the printing paper and are stacked in precisely the same order as they entered the machine; the finished prints are also stacked in the same order as the originals. It is therefore not necessary to search about for the prints when gathering them together, since after the printing work proper there are obtained a number of stacks of finished prints and a stack of originals, and in all these stacks the sheets are arranged in the same order.

Figure 2:
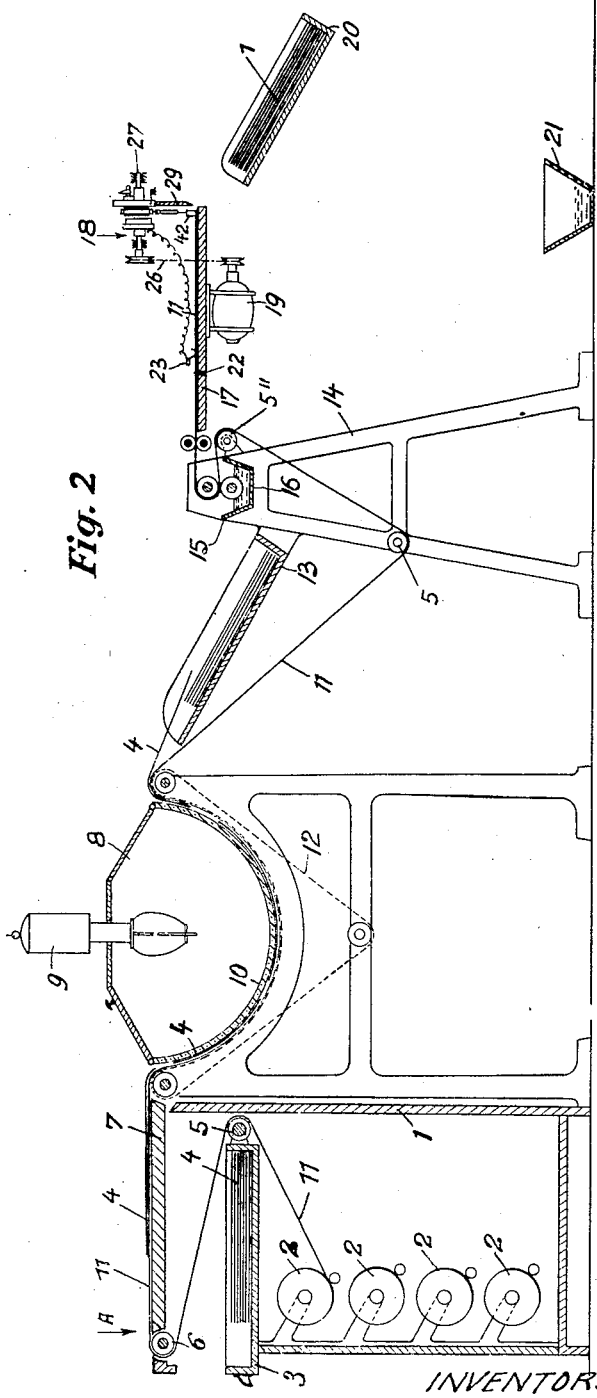

Two constructional examples of photoprinting machines in accordance with the invention are shown in the accompanying drawings, in which:

Fig. 1 shows a length of printing paper unwound from a roll and provided with different types of gauging or guide marks, Fig. 2 shows in side elevation and partly in section a photoprinting machine provided with a cutting device, Fig. 3 is a plan view of the rear end of the machine comprising the cutting device, Fig. 4 shows an embodiment of the transverse cutter as seen from the rear end of the machine, Fig. 5 shows the gearing between the member and the transverse cutter, together with an automatic disengageable clutch, Fig. 6 shows, in section, taken on the line VI—VI of Fig. 5, the driving mechanism of a clamping bar disposed in front of the transverse cutter for holding the paper web fast during the cutting operation, Fig. 7 shows a modified form of the transverse cutter, Fig. 8 shows in cross-section a fragment of a printing paper web to which a metal contact is attached, Fig. 9 shows in transverse section a photoprinting machine taking sheets of printing paper, Fig. 10 is a partial side elevation, and Fig. 11 is a plan view of the paper table of this latter machine.

In the first form of construction shown in the drawings there is provided at one end of the printing machine a cupboard 1 containing a number of rolls 2 of photoprint paper. Above this cupboard there is a drawer or tray 3 for the originals 4 to be printed. One such original 4 is shown by way of example in broken lines in Fig. 1. This original has an all-round margin $4a$ which is delimited on the inside by a chain-dotted line $4c$ marking the limits of the actual area $4b$ covered by the drawing. The web 11 of photoprinting paper is of a breadth corresponding either to the breadth or to the height of the actual area $4b$ of the original drawing. The paper web is also provided at its edge with guide marks which may take the form for instance of punched holes $11a$ and $11b$ or of printed lines $11c$. The original drawings are then placed one after the other on the printing paper web 11, for instance in the manner indicated in Fig. 1, so that the front border line $4c$ exactly registers with the rear edge of the mark $11b$, while the lateral border lines $4c$ exactly register with the longitudinal edges of the paper web 11. The rear border line $4c$ is then bound to register with the front edge of one of the marks $11a$.

The web 11 of paper to be exposed travels first over a roller 5 at the back of the drawer 3, then over a roller 6, whence it travels over a table 7 provided especially for the purpose of placing the originals in position on the paper and formed if desired by the top of the above-mentioned cupboard, to an exposing device 8 which may be of any convenient design. In the example shown a lamp 9 is suspended over a transparent member 10 having the form of a segment of a cylinder, beneath which the paper web 11 is passed by being conveyed on an endless carrier cloth 12. The originals 4 from which prints are to be made are conveyed through the device by the paper web 11. The table 7 must be at least as large as the originals 4 to be printed.

To the rear of the exposing device in the direction of movement of the paper web the originals 4 are automatically detached from the paper web and caused to drop, in their original order, into a collecting tray 13 in which they are stacked, while the exposed paper web 11 travels on downwards at a steep pitch over rollers 5', 5" mounted in a framework 14, to a developing device 15. In the drawing there is shown a small bath 16 for a developer liquid as used in the so-called semi-wet method. It is equally possible to employ the wet or the dry developing and fixing method. The wet method may also be employed in connection with a dry type photoprinting machine.

Behind the framework 14 is placed a cutting table 17 over which the developed paper web 11 travels.

At the rear end of this table is provided gearing 18 and beneath the table a driving motor 19 for the operation, through the intermediary of this gearing, of a transverse cutter 29 for severing the individual prints 11' which then drop into a box 20 where they are collected and stacked in their original order. Beneath the cutting mechanism is provided a box 21 to catch the waste from the cutting operation.

The controlling of the cutter is effected in the example shown, by the guide marks $11a$ and $11b$ on the paper web 11. For this purpose there is provided on the table 17 beneath the paper web 11 a fixed counter-sunk contact 22, and above the paper web 11 a contact spring 23. These contacts are spaced in advance of the transverse cutter by a distance approximately equal to the length of a print. Each time a guide mark $11a$ or $11b$ passes between the contacts 22 and 23 a current circuit is closed whereby the cutter 29 is switched on either directly or through the intermediary of a relay. Fig. 3 illustrates the moment at which, owing to circuit closure by the guide mark denoted by $11a$ in the drawings, the cutter 29 is being operated to cut the paper web through in a transverse direction. When the paper web has travelled through the distance $a$ in the direction indicated by the arrow, the guide mark $11b$ situated to the left of the guide mark $11a$ again closes the operating current circuit, with the result that a second cut is made which separates from the paper web a waste strip of the breadth $a$ corresponding to the sum of the breadths of the two margins $4a$ of two consecutive original drawings 4 and comprising the two marks 11a and 11b.

In order to cut prints of other lengths, further contacts 22, 23 must be provided in the machine at suitable distances from the cutter 29, and the pairs of contacts not in use at any one time be rendered inoperative, for instance by lifting the respective contact springs 23. The motor 19 runs continuously and drives a shaft 27 by means of a cord or belt 26. On this shaft 27 there is provided a clutch the engaging member 28 of which (Fig. 5) is adapted to carry out a single revolution at a time and then to come to a standstill.

In the severing arrangement shown in Figs. 2, 3, 4 and 5 a two-armed shearing cutter 29 is pivoted on a pin 30. A spring 31 presses against the shorter arm 32 of the two-armed cutter 29 and tends to retain the cutter in its position of rest over the path of the paper web. A cam disc 33 on the clutch member 28 forces the cutter 29 downwards against the spring 31, as it rotates, and thereby operates the cutter.

The cam disc 33 is integral with the clutch member 28 mounted idly on the shaft 27. Fast on the shaft 27 is the other clutch member 34 having in its interior an electro-magnet 35. In the clutch member 28 is inserted a spring-loaded coupling pin 36 which, in the position of rest of the clutch, is retained in the position shown in Fig. 5 by a wedge member 37 fixed to the framework of the machine. The pin 36 is capable of engaging in a number of apertures 38 in the clutch member 34, and that in the following manner: As soon as the magnet 35 is excited by a current impulse it attracts the coupling member 28. The hook-shaped cranked outer end of the coupling pin 36 then slides clear of the wedge-shaped member 37 and the pin 36 drops into engagement with the nearest aperture 38. The clutch members 28 and 34 then remain interengaged, independently of the duration of the short current impulse effecting the interengagement, until, after a complete revolution, the pin 36 is withdrawn again from the aperture 38 by the action of the wedge-shaped member 37.

In order to ensure that the clutch comes to a standstill after exactly one revolution there is mounted in the revolving clutch member 28 a bell-crank lever 39 one arm of which strikes against a stop 40 secured in the framework of the machine as soon as the coupling pin 36 is lifted. To enable the clutch to start rotating again the other arm of the bell-crank lever 39 takes the form of an armature which, on excitation of the magnet 35, is attracted and thereby removes the projecting arm of the bell-crank lever 39 from the stop 40. As soon as the current impulse ceases the bell-crank lever 39 returns into the arresting position in response to a spring 41.

Adjacent to the cutter 29 there is provided a clamping bar 42 (see Figs. 2, 5 and 6). This clamping bar is depressed by synchronised eccentrics 44, through the intermediary of telescopic interengaging rods 43, as soon as the clutch is engaged. The clamping bar 42 is caused to bear against the paper web 11 shortly before the cutting operation and remains bearing against the paper web, owing to the pressure exerted by springs 45, holding the paper web fast, until the cutting operation has been performed. One of the eccentrics is supported on the clutch member 28.

In the modified form of construction of the transverse cutter shown in Fig. 7 a shearing blade 46 is guided relatively to the paper web 11 by means of pins 47 and inclined slots 48. The advantage of this arrangement over that employing a pivoted cutter 29 consists in obtaining a drawing cut. In this case the clutch member 28 is connected to the cutter 46 by means of a thrust rod 49.

If the prints are to be delivered with a margin, i. e., untrimmed, it is only necessary to close the current circuit once for each cut. The prints are then cut along the lines at which the originals touched each other. In this case it is sufficient to provide one controlling guide mark 11a for each print, as shown in the middle portion of Fig. 1.

As shown in Fig. 8, the guide marks may consist of metallic contacts 50 clamped to the edge of the paper web 11. Any other mode of establishing contact may be employed which is suitable for starting the operation of the cutter. Controlling with the aid of guide marks need not necessarily be electric.

If the marks merely serve for positioning the originals on the printing paper while the automatic cutting of the prints from the paper web is effected otherwise than in direct dependence on the guide marks then these marks need merely be any visible marks 11c produced by printing or impression, as shown in the left-hand part of Fig. 1, provided they are capable of serving as guides in positioning the edges of the originals.

Referring to Figs. 9 to 11, 1a denotes the framework of the photoprinting machine, 3a the drawer which in this case serves to hold cut sheets 2a of printing paper, 4 an original drawing, 7a the distributing or paper table, 8 the printing or exposing device, 9 the electric lamp, 10 the transparent cylindrical segment, 12 the endless conveyor cloth, 13 the tray for the original drawings, 14 the supporting framework for the developing apparatus 15, and 20 the collecting tray for the prints 2a. The detaching of the originals 4 from the sheets 2a of printing paper at or near the rear guide roller 12a for the endless conveyor cloth may be effected mechanically by means of a wedge-shaped member 12b, or by any other suitable means.

The distributing table 7a which is preferably transparent and which may be illuminated from below, is provided with guide marks for the standard printing paper sheet sizes $A_1$, $A_2$, $A_3$, $A_4$; similar marks may also be provided for other sizes of prints. The positioning of an original is effected, for instance, in the case of size $A_1$, by placing the left-hand and right-hand rear corners of the marginal line 4c accurately against the marks denoted by $A_1$. The marks $A_2$ are used for size $A_2$, the four marks $A_3$ for a pair of originals of size $A_3$ to be positioned simultaneously, and the four marks $A_4$ for the simultaneous positioning of the two original drawings of size $A_4$. In two latter cases there are provided two drawers or a tray with two compartments for the reception of two stacks of prints 2a. The guide marks are so located that when the originals have been placed in position the leading edge of the original extends beyond the summit of the front driving roller 12a of the conveyor cloth 12, which is disposed in the midplane D—D of one of the uprights of the framework. The positioned drawing 4 and the sheet of printing paper 2a of appropriate size inserted in the manner described below are pressed by an automatically controlled roller 51 against the conveyor cloth 12 travelling over the feed roller 12a, and kept pressed against this cloth until the two parts 4 and 2a have been reliably gripped and have begun to be fed into the exposing device.

The means for inserting the cut sheets 2a of printing paper beneath the original drawings 4, and for controlling the pressing-up roller 51 supported with vertical adjustability in the framework 1a of the machine, are as follows: 52 denotes solid rubber rollers mounted on a carrying rod 52a with a one-way free-wheeling clutch device, which rest upon the sheets of printing paper stacked in the tray 3a, and which are reciprocated between the end positions shown in Fig. 9 by means of connecting rods 53 and rocking levers 54. At each forward movement these rollers push a sheet of printing paper forwards, while on the return stroke they are free to rotate and consequently roll over the top sheet of paper without moving it. Four rubber feed rollers 52 of this kind are provided corresponding to the number of sizes of sheets to be handled, and these rollers are adjustable in any suitable manner as by close friction of fit on their carrying rods 52a. The rocking lever 54 is fulcrumed at 55 beneath a bracket 56 which also serves to support the tray 3a from which a ramp 57 serving to guide the forward edge of the sheet of printing paper leads up to the first conveyor roller 12a.

The rocking levers 54 are driven by means of connecting rods 58 connected to a wrist-pin 59 on a crank element attached to a shaft 60 supported in the framework 1a of the machine. The crank elements take the form of cam discs 61 and are adapted, through the intermediary of rollers and push-rods 62 guided in the framework of the machine, to control the pressing-up roller 51 which is likewise journalled in the framework of the machine.

The shaft 60 is connected by means of a belt 63 with the shaft of a driving pinion 64 pertaining to change a speed gear 66 which is controllable by means of a hand lever 65, and in which movement is initiated by a shaft 67. This shaft 67 is adapted to be brought, by means of a clutch 68, into and out of engagement with the main shaft 69, from which is taken the drive for the conveyor cloth 12 and two endless cloth belts 70 which convey the exposed prints to the developing device.

The operation of the described apparatus is as follows:

An original drawing, for instance of the standard size DIN A1, is placed in position against the guide marks $A_1$ on the table 7a, in which position the forward edge of the drawing extends in between the spaced rollers 12a and 51, and projects some 4 to 5 cm. beyond the summit of the roller 12a. At the same time, by means of the rubber forwarding rollers 52 a sheet of photoprint paper of the same standard size as the original is fed in between the original and the contact roller until the forward edge of the sheet of printing paper registers with the forward trimming edge of the original drawing. In the course of the further operation of the machine the pressing-on roller 51 automatically descends and grips the original drawing and the sheet of printing paper between this roller and the guide roller 12, with the result that the original and the printing paper are jointly engaged and carried forward by the conveyor cloth 12. After the originals and the sheets of printing paper have travelled round the cylinder, the originals 4 are detached from the prints 2a by means of the wedge-shaped member 12b and deposited consecutively in the tray 13. The prints are fed by the conveyors 70 into the developing device 15 from which they are discharged and collected in sequence in a pile in the tray 20. As soon as an original and the sheet of printing paper have been engaged by the conveyor cloth 12 and have started to move, the pressing-on roll 51 is automatically lifted, after which the insertion of the next original and sheet of paper can be proceeded with.

In making prints from smaller originals of the sizes DIN A2 to DIN A4 the parts 51 and 52 must carry out their periodical movements derived from the shaft 60 at a more rapid rate, which is obtained by the appropriate setting of the change speed gear 66.

Instead of a developing device 15 for dry developing it is also possible to employ a device for semi-wet developing or for wet developing. When wet prints are produced a drying device may be built on, and in this case the stacking of the finished prints is effected when the prints are discharged from the drying device.

The stacked sheets 2a are guided at the sides in the sliding tray 3a or in its compartments and bear with their rear edges against the end of this tray. Since the feed members 52 become lowered as the stack of sheets of printing paper becomes used up, and consequently carry out a progressively shorter stroke, it is advisable when using high stacks of printing paper to provide a quoin as indicated in dotted lines at 53, at the back of the sliding tray, for the purpose of inclining the rear end of the stack to a slope of such a pitch that the shortening of the stroke of the feed members 52 due to the reduction in the height of the stack is compensated for.

Instead of the described rollers 12a and 51 it is equally possible to employ any other type of conveying or advancing rollers.

The term "photoprints" and similar terms used herein are intended to be interpreted in the broadest sense and embracing "blueprints" and the like.

We claim:

1. A photoprinting machine comprising in combination a framework, a holder for a stack of sheets of photoprint paper mounted on said framework, a distributing table having guide marks corresponding to the size of said sheets disposed above said table, an exposing device comprising a source of illumination and a transparent cylindrical segment member supported on said framework adjacent said table, conveying means comprising a guide roller adjacent each end of said cylindrical segment member at least one guide roller in spaced relation to the outside of said cylindrical member an endless travelling belt laid around said rollers and contacting with the outside surface of said cylindrical member and means for rotating at least one of said rollers, a movable nipping roller supported in guideways in said framework over said guide roller adjacent the starting end of said cylindrical member and forming with said roller a pair of intake rollers, an intake guideway between the nip of said intake rollers and the entry end of said cylindrical member, means for periodically moving said nipping roller into and out of contact with said first guide roller, means supported on said framework for forwarding the said sheets one at a time from said holder into a position in which the forward edge of the sheet is in the nip of said intake rollers, said forwarding means being coupled with said nipping roller operating means, means for driving said coupled forwarding and operating means, means for detaching and collecting originals from said sheets adjacent the discharge end of said cylindrical member, a developing device in spaced relation to and in alignment with said exposing device, means for conveying said sheets from the discharge end of said exposing device into and through said developing device, and means for collecting said sheets on leaving said developing device.

2. A photoprinting machine as claimed in claim 1, further comprising change-spaced transmission gearing between said driving means on the one hand and said forwarding and operating means on the other hand, for the purpose of adjusting the stroke of said forwarding means and the timing of said nipping roller operating means for different sizes of said sheets.

3. A photoprinting machine as claimed in claim 1, in which the said marks are so positioned on said distributing table that the forward edge of an original placed against the marks corresponding to the size of said original extends into the nip of said intake rollers for registration with the forward edge of the next of said sheets advanced by the said forwarding means.

4. A photoprinting machine as claimed in claim 1, further comprising an inverted quoin in the rear end of said holder to stagger said sheets for the purpose of compensating variation in the stroke of said forwarding means due to reduction in the height of the stack of the sheets in the holder.

5. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, a table in front of the exposing device, said table being provided with guide marks for the originals, a box beneath said table for the reception of sheets of photoprint paper corresponding in size at least to the area of the originals to be printed, and means driven by the machine and adapted automatically to forward single sheets of paper from said box and under an original placed by hand on said table and travelling into the exposing device.

6. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, a table in front of the exposing device, said table being provided with guide marks for the originals, a box beneath said table for the reception of sheets of photoprint paper corresponding in size at least to the area of the originals to be printed, means driven by the machine and adapted automatically to forward single sheets of paper from said box and under an original placed by hand on said table and travelling into the exposing device, and two feed rollers driven by the machine and arranged between said table and the exposing device and arranged to engage and disengage in synchronism with said forwarding means for automatically feeding the periodically forwarded original and the sheet of paper lying underneath it into the exposing device.

7. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, said exposing device having an endless conveyor cloth passed around guide rollers, a table provided with guide marks for the originals and disposed in front of the exposing device, a box beneath said table for the reception of sheets of photoprint paper corresponding in size at least to the area of the originals to be printed, means driven by the machine and adapted automatically to forward single sheets of paper from said box and under an original placed by hand on said table and travelling into the exposing device, and arranged above the guide roller positioned between the table and exposing device, and a roller driven by the machine, said roller being capable of up and down movement in synchronism with said forwarding means for pressing the periodically forwarded original together with the sheet of paper lying underneath it against the guide roller.

8. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, said exposing device having an endless conveyor cloth passed around guide rollers, a table provided with guide marks for the originals and disposed in front of the exposing device, a box beneath said table for the reception of sheets of photoprint paper corresponding in size at least to the area of the originals to be printed, means driven by the machine and adapted automatically to forward single sheets of paper from said box and under an original placed by hand on said table and travelling into the exposing device, a roller driven by the machine arranged above the guide roller positioned between said table and exposing device and capable of up and down movement in synchronism with said forwarding means for pressing the periodically forwarded original together with the sheet of paper lying underneath it against the guide roller, and a change speed gear arranged in the drive for the forwarding means and the pressing-up roller and having its settings timed in relation to the paper sizes of the originals.

9. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, a table provided with guide means for the originals and disposed in front of the exposing device, a box beneath said table for the reception of sheets of photoprint paper corresponding in size at least to the area of the originals to be printed, means driven by the machine and adapted automatically to forward single sheets of paper from said box and under an original placed by hand on said table and travelling into the exposing device, and means for compensating for deviations in feed due to the reduction in the height of the stack and the displacement of the forwarding members.

10. A photoprinting machine, comprising in combination means for effecting continuous accurate registering of the originals with photoprint paper of a breadth equal to one main dimension of the finished prints, an exposing device adjacent said means, a developing device in spaced relation to and in alignment with said exposing device, means disposed between said exposing device and developing device for detaching said originals from said paper, means for automatically collecting and stacking said originals and the developed prints in their original order, a table provided with guide marks for the originals and disposed in front of the exposing device, a box beneath said table for the reception of sheets of photoprint paper corresponding in size at least to the area of the originals to be printed, means driven by the machine and adapted automatically to forward single sheets of paper from said box and under an original placed by hand on said table and travelling into the exposing device, and in said box a quoin displacing the sheets of the stack and adapted to compensate for the deviations in feed due to the reduction in the height of the stack and the displacement of the forwarding members.

PAUL KÖNIG.
RUDOLF KÖNIG.